United States Patent [19]

Tottori et al.

[11] Patent Number: 4,941,064
[45] Date of Patent: Jul. 10, 1990

[54] MAGNETIC HEAD HAVING A PAIR OF CORES IN WHICH THE OPPOSING SURFACES THEREOF ARE COATED WITH A NON-MAGNETIC LAYER AND A LOW MELTING POINT GLASS LAYER

[75] Inventors: Takeshi Tottori, Toride; Hideo Fujiwara; Osamu Inagoya, both of Ibaragi, all of Japan

[73] Assignee: Hitachi Maxell, Ltd., Osaka, Japan

[21] Appl. No.: 201,397

[22] Filed: May 26, 1988

Related U.S. Application Data

[63] Continuation of Ser. No. 841,787, Mar. 20, 1986, abandoned.

[30] Foreign Application Priority Data

Mar. 20, 1985 [JP] Japan .................... 60-54119

[51] Int. Cl.$^5$ .................... G11B 5/235; G11B 5/265; G11B 5/31
[52] U.S. Cl. .................... 360/120; 360/121; 360/126
[58] Field of Search .................... 360/120, 121, 126

[56] References Cited

U.S. PATENT DOCUMENTS 4,182,643  1/1980  Calderon et al. .................... 360/120
4,392,167  7/1983  Joormann .................... 360/120

FOREIGN PATENT DOCUMENTS 0128586  12/1984  European Pat. Off. .
2079515  1/1982  United Kingdom .

OTHER PUBLICATIONS

Patent Abstracts of Japan, vol. 9, No. 141 (JP-A-6020306) (Hitachi Seisakusho K.K.), 2/1/85.
Patent Abstracts of Japan, vol. 8, No. 228 (JP-A-59107414) TDK K.K.), 6/21/84.
Patent Abstracts of Japan, vol. 8, No. 23, (JP-A-58179925) (Pioneer K.K.), 10/21/83.
Patent Abstracts of Japan, vol. 9, No. 314, (JP-A-60145514), (Matsushita Denki Sangyo K.K.), 8/1/85.

Primary Examiner—Robert S. Tupper
Attorney, Agent, or Firm—Birch, Stewart, Kolasch & Birch

[57] ABSTRACT

In a magnetic head comprising a first and second core halves bonded together defining a magnetic gap, an non-magnetic thin layer is formed on the surface of each core half facing to the magnetic gap using materials which are substantially chemically non-reactive with the component of an amorphous metallic magnetic thin layer of each half and low melting point glass, and low melting point glass thin layer formed on the non-magnetic thin layer made of glass having a melting of point of temperature lower than the crystallization temperature of the amorphous metallic magnetic thin layer.

5 Claims, 3 Drawing Sheets

MAGNETIC HEAD HAVING A PAIR OF CORES IN WHICH THE OPPOSING SURFACES THEREOF ARE COATED WITH A NON-MAGNETIC LAYER AND A LOW MELTING POINT GLASS LAYER

This application is a continuation of application Ser. No. 841,787 filed on Mar. 20, 1986, now abandoned.

BACKGROUND OF THE INVENTION

1. Field of the Invention

The present invention relates to a magnetic head, and more particularly to a magnetic head comprising a pair of core halves and one or more thin magnetic metal layers attached to each side surface of the core half facings to provide the magnetic gap between the core halves.

2. Description of the Prior Art

A conventional magnetic head of the above type is shown in FIG. 1, wherein the magnetic head is comprised of a first core half 1, a second core half 2 and a coil winding (not shown) wound across coil winding opening 3 defined in the first core half 1. Said first core half 1 is comprised of a first core base 4 and a first magnetic thin layer 6 made of metallic magnetic material having a high saturation magnetic flux density and fitted on the side surface of the first core base 4 opposing to a magnetic gap 5. Said second core half 2 is also comprised of a second core base 7 and a second magnetic thin layer 8 made of metallic magnetic material having a high saturation magnetic flux density and fitted on the side surface of the second core base 7. In the prior art, in order to define the magnetic gap length of smaller than 0.5 $\mu$m, each of the surfaces of the first and second core halves 1 and 2 which form the magnetic head gap 5 is coated by $SiO_2$ material, while the other parts of both core halves 1 and 2 are connected by means of plastic resin or glass of low temperature melting glass.

However, the opposing surfaces of the halves defining the magnetic gap 5 are covered only by the magnetic thin layers 6 and 8 and $SiO_2$ layer. Therefore the opposing surfaces are basically not mechanically bonded, but the geometrical relation of both opposing surface to define the magnetic gap is kept only by the bonding of the plastic resin materials or low temperature melting materials present in the parts of the first and second halves 1 and 2, other than the magnetic gap 5. Therefore, in the process of grinding the sliding surface of the magnetic head on which the magnetic recording medium slides, the $SiO_2$ layer tends to be separated from the connecting surfaces, whereby there is a disadvantage in that a correct gap length at the magnetic gap 5 can not be obtained.

Another conventional way of bonding the opposing surfaces is to form a glass thin layer by sputtering or vacuum evaporation in the region of the opposing surfaces of the magnetic gap 5, then melting the glass under 700° to 800° C. However, in case amorphous magnetic alloy is used for the magnetic thin layers 6 and 8, the amorphous magnetic alloy is crystallized, thereby resulting in lowering the magnetic characteristic of the magnetic head. On the other hand, in case the low temperature melting glass is used for bonding the core halves 1 and 2, there is a tendency for a chemical reaction to occur between the low temperature melting glass and the amorphous magnetic alloy of the magnetic thin layers 6 and 8, thereby lowering the magnetic characteristic of the magnetic head.

SUMMARY OF THE INVENTION

An essential object of the present invention is to provide a magnetic head in which the magnetic gap can be strongly bonded while still maintaining good magnetic characteristics of the magnetic head.

Another object of the present invention is to provide a magnetic head having a small magnetic gap which is hard to break.

In order to accomplish the objects mentioned above according to the present invention, there is provided a magnetic head in which an non-magnetic layer is formed on the opposing surfaces of the core halves so as to prevent chemical reaction between the low temperature melting glass and the metallic magnetic layers, and a low temperature melting glass layer is formed on the non-magnetic layer.

DETAILED DESCRIPTION OF THE PREFERRED EMBODIMENT

Figure 1:
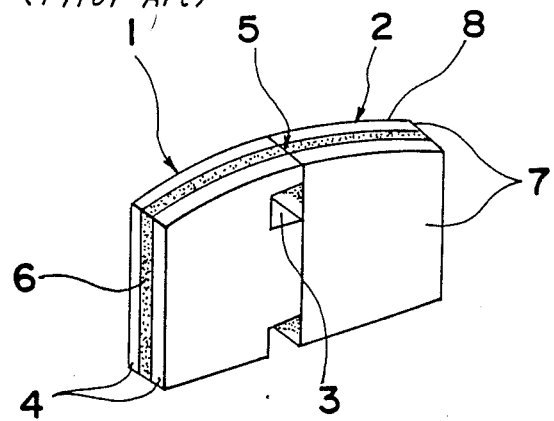
FIG. 1 is a perspective view of a conventional magnetic head.

Before the description proceeds, it is noted that like parts are designated by like reference numerals and details of the like parts mentioned already are hereinafter omitted.

Figure 2:
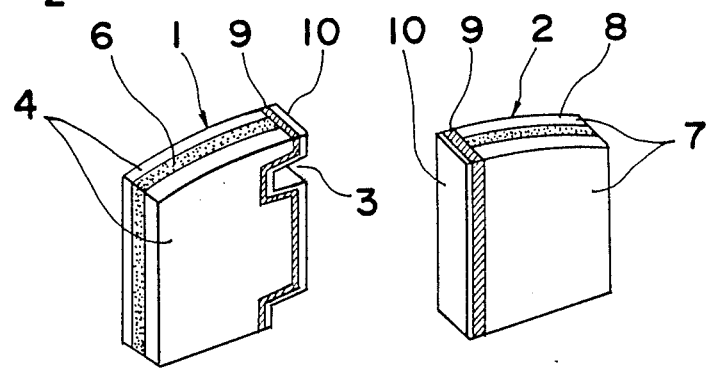
FIG. 2 is an exploded view of a preferred embodiment of the magnetic head according to the present invention.
Figure 3:
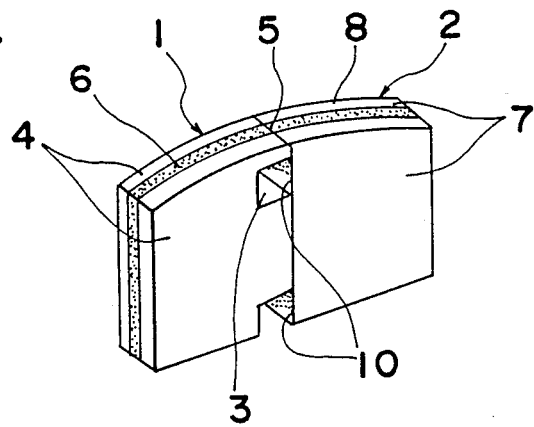
FIG. 3 is a perspective view showing the magnetic head in which two parts shown in FIG. 2 is assembled together.

Referring to FIG. 2 and FIG. 3, a non-magnetic thin layer 9 of $SiO_2$ is formed on the surface opposing to provide the magnetic gap 5 of each of the halves 1 and 2. A low melting point glass thin layer 10 is coated on the surface of the non-magnetic layer 9 of each of the halves 1 and 2. The low melting point glass thin layer is made of resin or low melting point glass.

As the materials of the first core base 4 and the second core base 7, single crystal manganese zinc ferrite is preferably used. It is unnecessary for core bases 4 and 7 to be made of magnetic material, core bases 4 and 7 may be made of non-magnetic materials such as zinc ferrite (ZnO, $Fe_2O_3$), barium titanate (BaTiO3), calcium titanate (CaTiO3) or Fotoceram manufactured by Corning Glass Works.

As the materials of the first magnetic thin layer 6 and second magnetic thin layer 8, there may be used an alloy such as Fe-Al-Si so called sendust comprising one or more elements selected from the group consisting of iron, nickel, cobalt, and one or more elements selected from the group consisting of phosphorus, carbon, boron, silicon or an alloy comprising the above mentioned alloy as the main component and one or more additional elements selected from the group consisting of aluminum, germanium, beryllium, tin, indium, molybdenum tungsten, titanium, manganese, chromium, zirconium, hafnium, niobium, boron, silicon, vanadium and ruthenium or an alloy in which cobalt or niobium is used as the main component and one or more of the above mentioned additional elements are added.

Especially, the amorphous alloy that contains cobalt and niobium as the main composition and one or more of the elements selected from the group consisting of aluminum, germanium, beryllium, tin, indium, molybdenum, tungsten, titanium, maganese, chromium, zirconium, hafnium, are added thereto is suitable for forming the magnetic thin layer partly because the amorphous alloy has a high saturation magnetic flux density and good magnetic characteristic and partly because a thin layer having a desired thickness can be easily formed.

The essential difference of the magnetic head shown in FIGS. 2 and 3 from that shown in FIG. 1 is in that there are formed non-magnetic thin layers 9 and low melting point glass thin layers 10 are respectively formed on the contact surfaces of the first core half 1 and the second core half 2.

As the materials for the low melting point glass thin layer 10, such materials that can be softened at a temperature on which the amorphous alloy magnetic thin layer is not crystallized, so that the first core half 1 and second core half 2 are bonded together may be used. Normally the amorphous alloy magnetic thin layer tends to be crystallized at a temperature higher than 530° C., therefore a low melting point glass which can be softened at relatively low temperature preferably below 430° C. may be suitable. As the low melting point glass having such low melting point, composition containing PbO, $B_2O_3$, $SiO_2$ and $Al_2O_3$ with the respective rates of 85.72 to 88.33% by weight, 6.93 to 9.34% by weight, 1.89 to 4.70% by weight and 1.15% to 2.66% by weight may be suitable. Also, PbO-$B_2O_3$-ZnO system, $B_2O_3$-PbO-$Ti_2O$ system or $B_2O_3$-ZnO-$V_2O_5$ compositions may be used. As the non-magnetic thin layer 9, it is necessary to use such materials that are substantially chemically non-reactive with the components of amorphous metallic magnetic thin layer and the component of the low melting point glass. As materials having chemical stability against the amorphous metallic magnetic thin layer and low melting point glass, ruthenium (Ru), rhodium (Rh), silicon (Si), chromium (Cr), $SiO_2$, $Si_3N_4$ or SiC may be used In particular, $SiO_2$ may be suitable for increasing the mechanical strength of the head around the magnetic gap since it has a suitable strong hardness.

Abutting of the first core half 1 and second core half 2 through the low melting point glass thin layers 10, the low melting point glass thin layers 10 and non-magnetic thin layer 9 define the magnetic gap 5. The magnetic gap is selected smaller than 2.0 $\mu$m. It is required that the magnetic gap 5 is as narrow as possible to enable the high density information recording. In order to record information in a recording medium of high coercive force using metallic magnetic recording elements, it is appreciated to use the magnetic head having amorphous magnetic thin layer with high saturation flux density and to make the magnetic gap length less than 0.5 $\mu$m. In case of adopting such narrow magnetic gap, if the low melting point glass thin layers 10 is too thick, there occurs chemical reaction not only between the composition of the non-magnetic thin layer and that of the low melting point glass thin layers 10 but also between the composition of the low melting point glass thin layers 10 and that of the magnetic thin layers 6 and 8, thereby reducing the magnetic characteristic of the magnetic head. Therefore, preferably the thickness of the low melting point glass thin layers 10 is smaller than 1/1 of the thickness of the non-magnetic thin layer 9. Particularly in case of using $SiO_2$ as the non-magnetic thin layer 9, there tends somewhat to cause chemical reaction with the low melting point glass thin layers 10, therefore, it is desired to make the low melting point glass thin layers 10 thin. In view of the fact mentioned above, preferably the low melting point glass thin layers 10 may be 3/5 to 1/6 of the non-magnetic thin layer 9. Typically the thickness of the non-magnetic thin layer 9 formed on one of the halves 1 and 2 is selected to 0.01 to 0.01 $\mu$m, therefore, thickness of the low melting point glass thin layers 10 may be 0.006 to 0.1 $\mu$m.

PREFERRED EMBODIMENTS

EXAMPLE 1

As shown in FIG. 2, the non-magnetic thin layers 9 were formed on the opposing surfaces of the first core half 1 and the second core half 2 respectively by means of sputtering using $SiO_2$ with 0.05 $\mu$m thick. The condition of the sputtering was RF power of 1 KW under the atmosphere of $5 \times 10^{-3}$ Torr argon pressure containing 10% of oxygen.

The low melting point glass thin layers 10 were formed on the non-magnetic thin layers 9 with 0.015 $\mu$m thick by sputtering using low melting point glass PbO (85.0% by weight)—$B_2O_3$ (11.5% by weight)—$SiO_2$ (3.5% by weight). The condition of the sputtering of the low melting point glass was RF power of 0.2 KW under the atmosphere of $5 \times 10^{-3}$ Torr argon pressure containing 10% of oxygen.

Subsequently, the core halves except for the coil winding opening 3 and the inner wall portions of the opening were heated with 430° C. and pressed and the core halves were bonded by the low melting point glass thin layers 10 to define the magnetic gap length of 0.17 $\mu$m. The coercive force of the magnetic thin layer were kept unchanged from the initial coercive force of 0.8 oersted and the saturation magnetic flux density was not changed.

EXAMPLE 2

Magnetic heads having the magnetic gap were prepared under the same condition in the example 1 except that the non-magnetic thin layer 9 of each core half was 0.065 $\mu$m thick and the low melting point glass thin layer 10 of each core half was 0.020 $\mu$m thick. The yield of the magnetic head having the magnetic gap length less than 0.20 $\mu$m was 79% and the magnetic characteristics of the magnetic thin layer was kept unchanged.

COMPARATIVE EXAMPLE 1

A magnetic head having the magnetic gap was prepared under the same condition in the example 1 except that the non-magnetic thin layer 9 of $SiO_2$ of each core half was 0.015 $\mu$m thick and the low melting point glass thin layers 10 of each core half was 0.015 $\mu$m. In this comparative example 1, the magnetic saturation flux density was decreased to 9000 gauss from 9500 gauss obtained in the examples 1 and 2.

COMPARATIVE EXAMPLE 2

Magnetic heads each having the magnetic gap were prepared in the same manner as in the example 1 except that the non-magnetic thin layer 9 of each core half was 0.065 μm and the low melting point glass thin layer 10 was not formed. The yield of the magnetic head having the magnetic gap length less than 0.20 μm. was 43%.

In the examples 1 and 2 and comparative examples 1 and 2, there was used such low melting point glass of the low melting point glass thin layers 10 having the thermal expansion factor $\alpha$ of $110 \times 10^{-7}$/°C., the glass transition point of 305° C. and softening temperature of 355° C. The working temperature was 430° C. The crystallization temperature of the amorphous alloy used for the non-magnetic thin layer 8 was 530° C.

As mentioned above, since the softening point 355° C. of the low melting point glass thin layer 10 is lower than the working temperature 430° C., bonding in the magnetic gap 5 becomes strong and since the crystallization temperature 530° C. of the amorphous alloy used in the non-magnetic thin layer 9 is higher than the working temperature 430° C., the magnetic characteristic of the magnetic head according to the present invention is not lowered.

EXAMPLE 3

Figure 4:
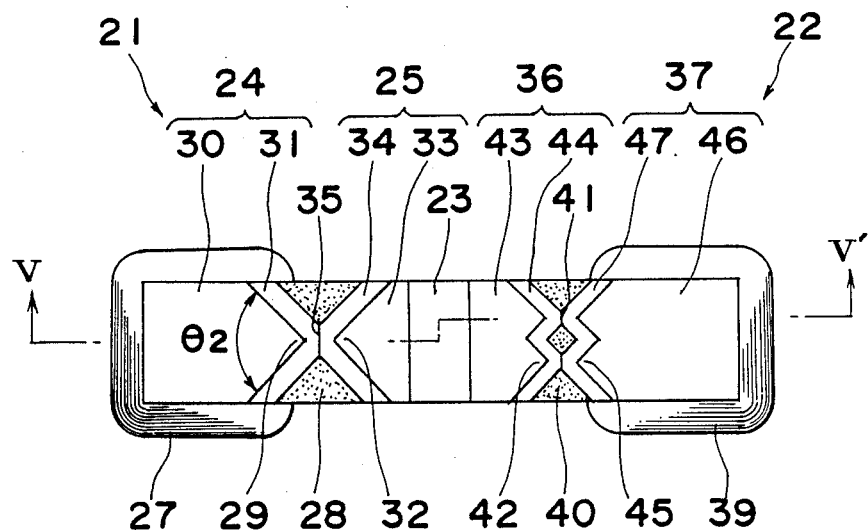
FIG. 4 is a top plan view showing a third embodiment of a composite magnetic head according to the present invention.
Figure 5:
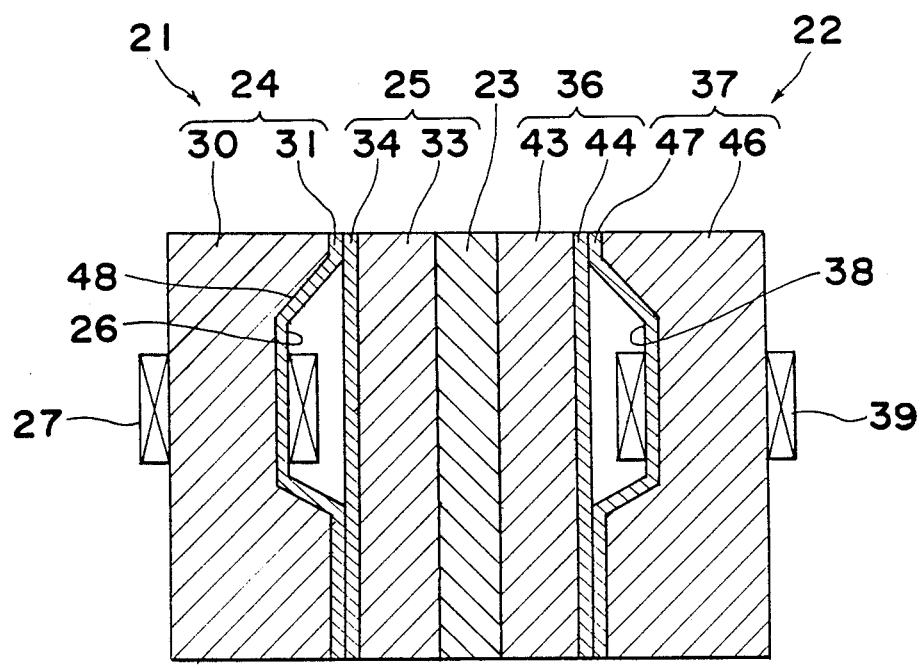
FIG. 5 is a cross sectional view taken along the lines V—V' in FIG. 4.

An example of a composite magnetic head according to the present invention is shown in FIGS. 4 and 5.

Referring to FIGS. 4 and 5, a composite magnetic head for use in a magnetic disc recording and reproducing device (referred to as a magnetic disc player hereinafter) is provided with a recording and reproducing head 21, an erasing head 22 and a magnetic barrier 23 made of non-magnetic material and disposed between both heads 21 and 22 so as to prevent undesired magnetic interference between both heads 21 and 22. The composite magnetic head is mounted in the magnetic disc player in such a manner that the recording and reproducing head 21 is at the upper stream side of the rotation of a magnetic disc in the magnetic disc player with the erasing head 22 located at the lower stream side.

The recording and reproducing head 21 generally comprises a first core half 24, a second core half 25 disposed opposite to the first core half 24 and an exciting coil 27 wound on the first core half 24 passing a coil slot 26 defined on the first core half 24. Reinforcing members 28 made of non-magnetic material such as glass are disposed near the regions where the first core half 24 and second core half 25 contact together.

The first core half 24 is composed of a first core base 30 having a projected part 29 formed centrally on the side which faces to a magnetic gap 35 and a first magnetic thin layer 31 laid on the surface of the side facing to the magnetic gap 35.

The first core base 30 is made of ferrite of high permeability such as manganese zinc ferrite or nickel zinc ferrite. The first magnetic thin layer 31 is made of crystalline alloy or amorphous alloy of high saturation magnetic flux density and high permeability. As the amorphous alloy, there may be used magnetic materials containing cobalt (84 atomic %)—niobium (12.5 atomic %)—zirconium (3.5 atomic %).

The second core half 25 is also composed of a second core base 33 made of ferrite of high permeability, having a projection 32 formed on the side opposite to the magnetic gap 35 and a second magnetic thin layer 34 having high saturation magnetic flux density and high permeability and formed on the surface of said side which opposes to the gap 35. As shown in FIG. 4, the projected part 29 of the first core half 24, the first magnetic thin layer 31 and the projected part 32 of the second core half 25, the second magnetic thin layer 34 are substantially symmetrical relative to the magnetic gap 35 in the region near the contacting area. The magnetic gap 35 is about 100 to 150 μm long.

The erasing head 22 comprises a first core half 36, second core half 37 and an excitation coil 39 wound around the second core half 37 through a coil slot 38. Reinforcing members 40 are disposed near the contacting area of the first core half 36 and second core half 37.

The end angle $\theta 2$, which is the angle between both slanted surfaces of the projected part 29 of the first core base 30 is greater than 90° but smaller than 150°. In case the end angle is smaller than 90°, that is an acute angle, in the process of forming the magnetic thin layer 31 on the surfaces of the projected part 29 by sputtering or vapouring, the angle of the slanted surface of the projected part against the target which forms the magnetic thin layer 31 is so large that it takes too much time for forming a thick magnetic layer, therefore, the productivity is low. In case the end angle $\theta 2$ is an acute angle, there tends to occur breakage of the portion of the projected part in the process of cutting to form the projected end, thereby reducing yields. On the other hand, in case the end angle is greater than 150°, the end portion of the projected part becomes nearly a flat surface, whereby a suspected magnetic gap is formed in the region near the slanted surface to reduce the recording and reproducing characteristics. Accordingly, in order to prevent occurrence of the partial breakage of the projected part and to produce the magnetic thin layer 31 having a desired thickness with a high productivity, avoiding formation of the suspected magnetic gap, the end angle 2 must be within about between 90° and 150°.

The definition of the end angle in the projected parts may be applicable to not only the first core half 24 but also second core half 25 and the first and core halves 36 and 37 of the erasing head 22.

Figure 6:
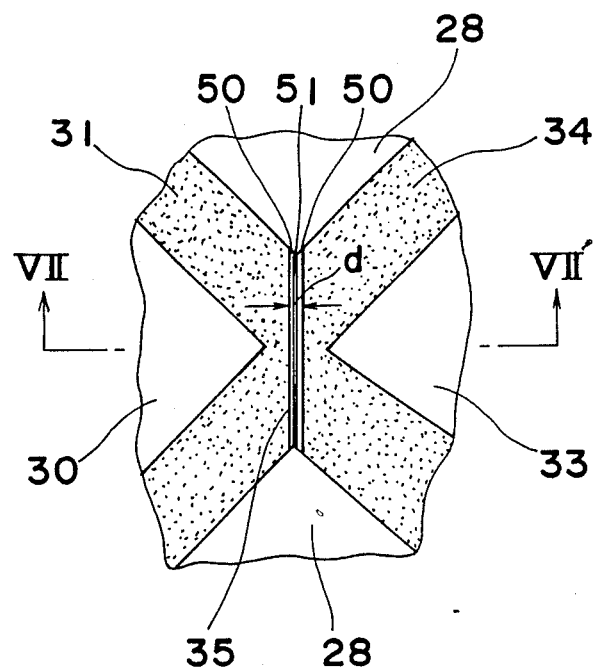
FIG. 6 is a partial top plan view showing a portion near the magnetic gap of the composite magnetic head shown in FIG. 4.
Figure 7:
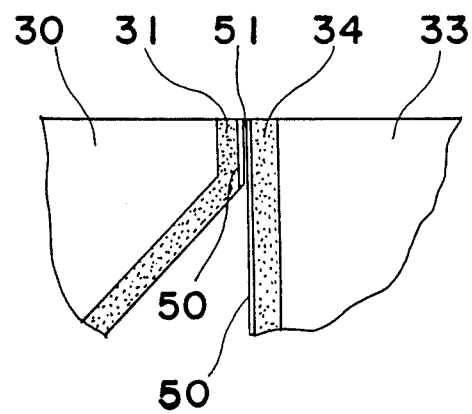
FIG. 7 is a partial cross sectional view taken along the lines VII—VII' in FIG. 6.

FIGS. 6 and 7 show an enlarged view of the magnetic gap region of the recording and reproducing head 21, and the non-magnetic gap region is composed of a magnetic thin layer 50 with 0.05 μm thick made of $SiO_2$ and low melting point glass thin layer 51 with 0.03 μm thick made of the materials consisting of PbO (85.93% by weight)—$B_2O_3$ (8.87% by weight)—$SiO_2$ (2.56% by weight)—$Al_2O_3$ (2.34% by weight), so that the magnetic gap length of 0.18 μm is defined. In this arrangement, change of the magnetic characteristics of the composite magnetic head is few.

As the non-magnetic thin layer 50 and low melting point glass thin layer 51 have their vertical ends integrally welded with a reinforcing layer, the mechanical bonding strength between the layers 50 and 51 can be reinforced, whereby the non-magnetic thin layer 50 and low melting point glass thin layer 51 can be prevented from being broken. In this embodiment, the magnetic gap of the erasing head 22 is also defined by a non-magnetic thin layer of $SiO_2$ with 0.6 μm thick and low melting point glass thin layer made of the same materials used in the low melting point glass thin layer in the recording and reproducing head mentioned above with 0.30 μm thick for each of the core halves 24 and 25 so that the magnetic gap length of the erasing head is 1.2 μm. These non-magnetic thin layer and low melting point glass thin layer are respectively formed by sputtering. In this case, change of the magnetic characteristics of the magnetic thin layer 44 and 47 is few.

What is claimed is:

1. A magnetic head comprising a first core half and a second core half, wherein each of said core halves comprises two core bases having an amorphous metallic magnetic thin layer sandwiched therebetween, said amorphous metallic magnetic thin layer having a high saturation magnetic flux density, at least one non-magnetic thin layer comprising $SiO_2$ formed on facing surfaces of each respective core half and a thin layer of a low melting point glass composition comprising PbO as the main component formed on said respective non-magnetic thin layer of each of said core halves, said first core half and said second core half being bonded together at said facing surfaces so as to define a magnetic gap of less than 0.5 $\mu$m at said facing surfaces of said magnetic head, said amorphous metallic thin layer being disposed so as to form a magnetic circuit of said magnetic head, said non-magnetic thin layer being substantially chemically non-reactive with said amorphous metallic magnetic thin layer component of the respective core half and said low melting point glass thin layer, and said low melting point glass thin layer glass composition has a melting point temperature which is lower than the crystallization temperature of said amorphous metallic magnetic thin layer, the thickness of said low melting point glass thin layer ranging from 3/5 to 1/6 the thickness of said non-magnetic thin layer.

2. The magnetic head according to claim 1, wherein said amorphous metallic magnetic thin layer comprises materials having crystallization temperature higher than 530° C. and the glass of said low melting point glass thin layers has a softening temperature lower than 430° C.

3. The magnetic head according to claim 1, wherein said amorphous metallic magnetic thin layer consists of an alloy comprising one or more elements selected from the group consisting of iron, nickel, and cobalt, and one or more elements selected from the group consisting of phosphorus, carbon, boron, and silicon or an alloy comprising the above mentioned alloy as the main component and one or more additional elements selected from the group consisting of aluminum, germanium, beryllium, tin, indium, molybdenum, tungsten, titanium, manganese, chromium, zirconium, hafnium, niobium, boron, silicon, vanadium and ruthenium or an alloy in which cobalt or niobium is used as the main component and one or more of the above mentioned additional elements are added.

4. The magnetic head according to claim 1, wherein said low melting point glass thin layer is a composition selected from $PbO-B_2O_3-ZnO$; or $B_2O_3-PbO_1Ti_2O$.

5. The magnetic head according to claim 4, wherein said low melting point glass composition comprises PbO, $B_2O_3$, $SiO_2$ and $Al_2O_3$ with respective contents by weight of 85.75 to 88.33%, 6.93 to 9.34%, 1.89 to 4.70% and 1.15% to 2.66%.

* * * * *